United States Patent
Yang et al.

(10) Patent No.: US 10,998,133 B2
(45) Date of Patent: May 4, 2021

(54) DIELECTRIC MATERIAL, METHOD OF MANUFACTURING THEREOF, AND DIELECTRIC DEVICES AND ELECTRONIC DEVICES INCLUDING THE SAME

(71) Applicant: SAMSUNG ELECTRONICS CO., LTD., Suwon-si (KR)

(72) Inventors: Daejin Yang, Yeongju-si (KR); Jong Wook Roh, Anyang-si (KR); Doh Won Jung, Seoul (KR); Chan Kwak, Yongin-si (KR); Hyungjun Kim, Seoul (KR); Woojin Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/848,562

(22) Filed: Dec. 20, 2017

(65) Prior Publication Data

US 2018/0261388 A1    Sep. 13, 2018

(30) Foreign Application Priority Data

Mar. 10, 2017  (KR) .................. 10-2017-0030659

(51) Int. Cl.
*H01G 4/06* (2006.01)
*C04B 35/49* (2006.01)
(Continued)

(52) U.S. Cl.
CPC ............. *H01G 4/10* (2013.01); *B32B 15/043* (2013.01); *B82B 1/005* (2013.01); *C04B 35/49* (2013.01);
(Continued)

(58) Field of Classification Search
CPC ... H01B 1/08; H01B 3/02; H01B 3/10; H01G 4/06; H01G 4/018; H01G 4/20; C04B 35/49; C04B 35/462; C04B 35/50
See application file for complete search history.

(56) References Cited

U.S. PATENT DOCUMENTS 4,309,295 A   1/1982  McSweeney
4,362,637 A   12/1982 Matsuo et al.
(Continued)

FOREIGN PATENT DOCUMENTS

EP    0634756 A2    1/1995
JP    2011184274 A  9/2011
(Continued)

OTHER PUBLICATIONS

Fukunaga et al., "Ferroelectricity in Layered Perovskites as a Model of Ultra-Thin Films", World JOurnal of Condensed Matter Physics, 6, 2016, pp. 224-243.
(Continued)

*Primary Examiner* — Mark Kopec
(74) *Attorney, Agent, or Firm* — Cantor Colburn LLP

(57) ABSTRACT

A dielectric material includes a layered metal oxide including a first layer having a positive charge and a second layer having a negative charge, wherein the first layer and the second layer are alternately disposed; a monolayered nanosheet; a nanosheet laminate of the monolayered nanosheets; or a combination thereof, wherein the dielectric material includes a two-dimensional layered material having a two-dimensional crystal structure, wherein the two-dimensional layered material is represented by Chemical Formula 1

$$X_2[A_{(n-1)}M_nO_{(3n+1)}]$$  Chemical Formula 1

(Continued)

wherein, in Chemical Formula 1, X is H, an alkali metal, a cationic polymer, or a combination thereof, A is Ca, Sr, La, Ta, or a combination thereof, M is La, Ta, Ti, or a combination thereof, and $n \geq 1$.

18 Claims, 9 Drawing Sheets

(51) Int. Cl.
*H01G 4/10* (2006.01)
*H01G 4/12* (2006.01)
*B82B 1/00* (2006.01)
*B32B 15/04* (2006.01)

(52) U.S. Cl.
CPC ...... *H01G 4/1227* (2013.01); *B32B 2307/204* (2013.01)

(56) References Cited

U.S. PATENT DOCUMENTS

| | | | |
|---|---|---|---|
| 4,403,236 A | 9/1983 | Mandai et al. | |
| 5,509,558 A | 4/1996 | Imai et al. | |
| 5,638,252 A | 6/1997 | Drab et al. | |
| 5,757,610 A | 5/1998 | Wada et al. | |
| 5,804,823 A | 9/1998 | Ramer et al. | |
| 6,143,679 A | 11/2000 | Nagasawa et al. | |
| 6,207,082 B1 | 3/2001 | Suzuki et al. | |
| 6,292,355 B1 | 9/2001 | Kang et al. | |
| 6,795,296 B1 | 9/2004 | Palanduz et al. | |
| 7,911,927 B2 | 3/2011 | Koinuma et al. | |
| 8,184,426 B2 | 5/2012 | Osada et al. | |
| 8,885,322 B2 | 11/2014 | Chai | |
| 9,187,842 B2 | 11/2015 | Nakajima et al. | |
| 9,543,500 B2 | 1/2017 | Osada et al. | |
| 10,475,583 B2* | 11/2019 | Kwak | H01C 17/06533 |
| 2010/0226067 A1* | 9/2010 | Osada | C04B 35/016 361/311 |
| 2011/0147060 A1 | 6/2011 | Osada et al. | |
| 2012/0217615 A1 | 8/2012 | Tatekawa | |
| 2013/0234293 A1 | 9/2013 | Kawamoto | |
| 2013/0286541 A1 | 10/2013 | Kawamoto | |
| 2018/0257991 A1* | 9/2018 | Roh | H01G 4/1227 |
| 2018/0286586 A1* | 10/2018 | Jung | C07C 211/63 |

FOREIGN PATENT DOCUMENTS

| | | |
|---|---|---|
| JP | 2014152052 A | 8/2014 |
| KR | 1020120091655 A | 8/2012 |
| KR | 1020140049190 A | 4/2014 |
| KR | 1398553 B1 | 5/2014 |
| KR | 101405078 B1 | 6/2014 |
| KR | 101522666 B1 | 5/2015 |

OTHER PUBLICATIONS

Li et al., "Solution-Based Fabrication of Perovskite Nanosheet Films and Their Dielectric Properties", Japanese Journal of Applied Physics, 48, 2009, 09KA15 pp. 1-5.
Liu et al., "A New n=4 Layered Ruddlesden-Popper Phase K2.5B12. 5Ti4O13 Showing Stoichiometric Hydration", Inorganic Chemistry, 55, 2016, pp. 1403-1411.
Schaak et al., "Perovskites by Design: A Toolbox of Solid-State Reactions", Chem, Mater. vol. 14, 2002. 1455-1471.
Schaak et al., "Prying Apart Ruddlesden-Popper Phases: Exfoliation into Sheets and Nanotubes for Assembly of Perovskite Thin Films", Chem. Mater. vol. 12, 2000, pp. 3427-3434.
Extended European Search Report dated Aug. 1, 2018, of the corresponding European Patent Application No. 18164562.3.
Extended European Search Report dated Jun. 22, 2018, of the corresponding European Patent Application No. 18152527.0.
Maeda K et al., "Perovskite oxide nanosheets with tunable band-edge potentials and high photocatalytic hydrogen-evolution activity", Angewandte Chemie, Sep. 26, 2014, pp. 13164-13168, vol. 53.
Minoru Osada et al., "A- and B-Site Modified Perovskite Nanosheets and Their Integrations into High-k Dielectric Thin Films", Applied Ceramic Technology, Dec. 5, 2011, pp. 29-36, vol. 9, Issue 1.
Minoru Osada, et al., "Two-Dimensional Dielectric Nanosheets: Novel Nanoelectronics from Nanocrystal Building Blocks", Adv. mater. 2012, 24, 210-228.
Korean Office Action for Korean Patent Application No. 10-2017-0030659 dated Jan. 20, 2021.

* cited by examiner

DIELECTRIC MATERIAL, METHOD OF MANUFACTURING THEREOF, AND DIELECTRIC DEVICES AND ELECTRONIC DEVICES INCLUDING THE SAME

CROSS-REFERENCE TO RELATED APPLICATION

This application claims priority to and the benefit of Korean Patent Application No. 10-2017-0030659, filed in the Korean Intellectual Property Office on Mar. 10, 2017, and all the benefits accruing therefrom under 35 U.S.C. § 119, the entire contents of which are incorporated herein by reference.

BACKGROUND

1. Field

A dielectric material, a method of manufacturing the same, and a dielectric device and an electronic device including the same are disclosed.

2. Description of the Related Art

A multi-layer ceramic condenser (MLCC) which is a miniature condenser having a large capacity is an electronic device obtained by alternately laminating a dielectric ceramic composition and an internal electrode and heat-treating the same simultaneously. However, according to the specifications for an electronic device to provide a small size, a thin film, and a higher capacity condenser, there remains a need for a condenser having smaller size and a thinner thickness, and a higher capacity than currently available multi-layered ceramic condensers.

An intergranular insulation type capacitor, which is a condenser which provides good dielectric characteristics, has an intergranular insulation layer between crystal grains, which are conductive or semi-conductive, and the intergranular insulation type capacitor may have a higher apparent relative permittivity than a currently available multi-layered ceramic condenser including a thick ceramic layer as a dielectric layer, so as to provide reduced size and higher capacity.

An apparent relative permittivity of the intergranular insulation type capacitor tends to be proportional to a particle size and inversely proportional to a thickness of the intergranular insulation layer, which is a dielectric material. However, a relative permittivity of the intergranular insulation layer is also decreased according to a decreasing thickness of the intergranular insulation layer, and thus the thickness of the intergranular insulation layer may be maintained at a predetermined thickness because of the relative permittivity of the intergranular insulation type capacitor. Accordingly, the remains a need for an improved dielectric material.

SUMMARY

An embodiment provides a dielectric material having a high relative permittivity even in a region having a thickness of several nanometers to several tens of nanometers, and a method of manufacturing thereof.

Another embodiment provides a dielectric device having high capacity as well as reduced size in a form of a thin film by including the dielectric material.

Also disclosed is an electronic device including the dielectric device.

According to an embodiment, a dielectric material includes a layered metal oxide including a first layer having a positive charge, and a second layer having a negative charge, wherein the first layer and the second layer are alternately disposed; a monolayered nanosheet; a nanosheet laminate of the monolayered nanosheets; or a combination thereof, wherein the dielectric material includes a two-dimensional layered material having a two-dimensional crystal structure, wherein the two-dimensional layered material is represented by Chemical Formula 1

$$X_2[A_{(n-1)}M_nO_{(3n+1)}]$$  Chemical Formula 1

Wherein, in Chemical Formula 1, X is H, an alkali metal, a cationic polymer, or a combination thereof, A is Ca, Sr, La, Ta, or a combination thereof, M is La, Ta, Ti, or a combination thereof, and n≥1.

The cationic polymer may include a C1 to C16 alkyl ammonium compound, an alkylamine compound, or a combination thereof.

The cationic polymer may include a tetramethylammonium compound, a tetraethylammonium compound, a tetrapropylammonium compound, a tetrabutylammonium compound, a methylamine compound, an ethylamine compound, a propylamine compound, a butylamine compound, or a combination thereof.

The first layer of the layered metal oxide may include at least one of a proton or an alkali metal ion.

The monolayered nanosheet may include a second layer exfoliated from the layered metal oxide.

The monolayered nanosheet may include the cationic polymer attached to a surface of the second layer.

The monolayered nanosheet may include at least two kinds of the cationic polymer attached to a surface of the second layer.

The two-dimensional layered material may have a relative permittivity of greater than or equal to about 100.

The two-dimensional layered material may further satisfy Chemical Formula 2.

$$X_2[La_pA'_{(n-1-p)}M'_nO_{(3n+1)}]$$  Chemical Formula 2

In Chemical Formula 2, X is H, an alkali metal, and a cationic polymer, or a combination thereof, A' is Ca, Sr, or a combination thereof, M' is Ta, Ti, or a combination thereof, n≥1, p>0, and n−1−p≥0.

The two-dimensional layered material may further satisfy Chemical Formula 3.

$$X_2[A''_{(n-1)}Ta_mTi_{(n-m)}O_{(3n+1)}]$$  Chemical Formula 3

In Chemical Formula 3, X is H, an alkali metal, a cationic polymer, or a combination thereof, A'' is Ca, Sr, La, or a combination thereof, n≥1, m>0, and n−m>0.

In an embodiment, a method of manufacturing a dielectric material includes: preparing a layered metal oxide including a first layer having a positive charge and a second layer having a negative charge, wherein the first layer and the second layer are alternately disposed, acid-treating the layered metal oxide to exchange the first layer with protons, colloidizing the acid-treated layered metal oxide to replace the protons by cationic polymers, and exfoliating the monolayered nanosheet including the second layer from the colloidized layered metal oxide to manufacture the dielectric material.

The method of manufacturing the dielectric material may be colloidizing the acid-treated layered metal oxide with at least two kinds of the cationic polymers.

A dielectric device includes a plurality of crystal grains, each consisting of a semi-conductive or conductive material, and a grain boundary insulation layer surrounding each crystal grain of the plurality of crystal grains, the grain boundary insulation including a two-dimensional layered material represented by Chemical Formula 1 and having a two-dimensional crystal structure, $$X_2[A_{(n-1)}M_nO_{(3n+1)}] \qquad \text{Chemical Formula 1}$$

wherein, in Chemical Formula 1, X is H, an alkali metal, a cationic polymer, or a combination thereof, A is Ca, Sr, La, Ta, or a combination thereof, M is La, Ta, Ti, or a combination thereof, and n≥1.

The two-dimensional layered material may include at least one of a layered metal oxide including a first layer having a positive charge and a second layer having a negative charge which are alternately disposed, a monolayered nanosheet exfoliated from the layered metal oxide, and a nanosheet laminate of the monolayered nanosheets.

The two-dimensional layered material may cover an entire surface of the crystal grain.

The cationic polymer may include a C1 to C16 alkyl ammonium, an alkylamine, or a combination thereof.

The two-dimensional layered material may be included in an amount of about 10 volume % to about 100 volume % based on 100 volume % of the grain boundary insulation layer.

The crystal grain may consist of a material including barium titanate, strontium titanate, lead titanate, lead zirconate, lead zirconate titanate, or a combination thereof.

According to another embodiment, an electronic device includes the dielectric device.

The electronic device may be a varistor, a thermistor, or an energy storage capacitor.

The relative permittivity of the dielectric material according to an embodiment includes a two-dimensional layered device that does not decrease below the predetermined level even if the thickness is decreased and thus an ultra-thin film may be available.

When it is applied to a dielectric device such as an intergranular insulation layer capacitor, and the like, an ultra-thin film may be provided and improved relative permittivity may be provided.

The dielectric material including the two-dimensional layered device may be manufactured using a method having improved commercial value.

DETAILED DESCRIPTION

Figure 1:
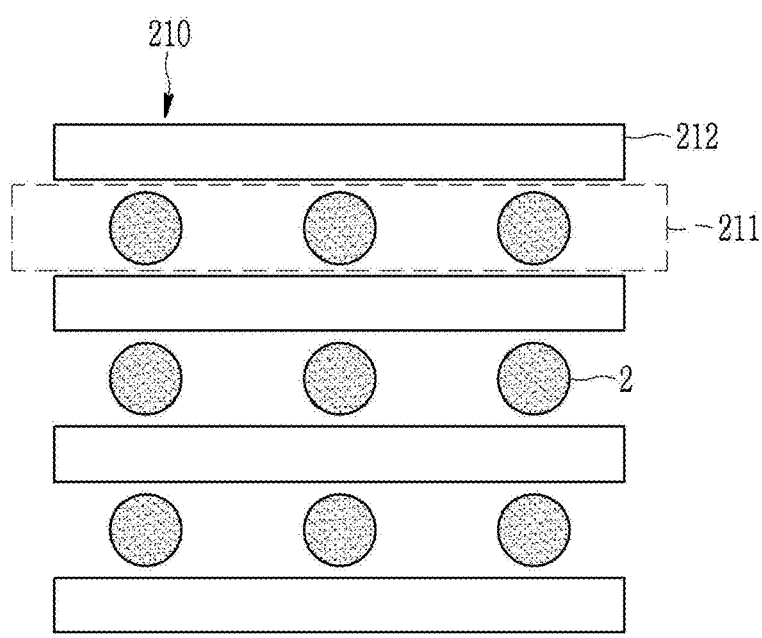
FIG. 1 schematically shows a crystal structure of an embodiment of a two-dimensional layered material when n=2 in Chemical Formula 1 of a dielectric material.

Advantages and characteristics of this disclosure, and a method for achieving the same, will become evident referring to the following example embodiments together with the drawings attached hereto. However, the embodiments should not be construed as being limited to the embodiments set forth herein. Rather, these embodiments are provided so that this disclosure will be thorough and complete, and will fully convey the scope of the invention to those skilled in the art.

It will be understood that, although the terms "first," "second," "third" etc., may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

If not defined otherwise, all terms (including technical and scientific terms) in the specification may be defined as commonly understood by one skilled in the art. The terms defined in a generally-used dictionary may not be interpreted ideally or exaggeratedly unless clearly defined.

The terminology used herein is for the purpose of describing particular embodiments only and is not intended to be limiting. In addition, unless explicitly described to the contrary, the word "comprise" and variations such as "comprises" or "comprising", will be understood to imply the inclusion of stated elements but not the exclusion of any other elements.

Further, the singular includes the plural unless mentioned otherwise. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Accordingly, in the drawings, the thickness of layers, films, panels, regions, etc., are exaggerated for clarity. Thus, the regions illustrated in the figures are schematic in nature and their shapes are not intended to illustrate the precise shape of a region and are not intended to limit the scope of the present claims. Like reference numerals designate like elements throughout the specification.

It will be understood that when a first element such as a layer, a film, a region, or a substrate is referred to as being "on" a second element, it can be directly on the other element or intervening elements may also be present. In contrast, when an element is referred to as being "directly on" another element, there are no intervening elements present. Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

According to an embodiment, a dielectric material may include a two-dimensional layered material having a two-dimensional crystal structure.

The two-dimensional layered material according to an embodiment may include a layered metal oxide including a first layer having a positive charge and a second layer having a negative charge, which are alternately disposed, e.g., laminated; a monolayered nanosheet exfoliated from the layered metal oxide; a nanosheet laminate of the monolayered nanosheets, or a combination thereof.

In an embodiment, the two-dimensional layered material may be a layered metal oxide, a monolayered nanosheet exfoliated from the layered metal oxide, a laminate of two or more monolayered nanosheets, or a combination thereof.

A two-dimensional layered material according to an embodiment may be represented by Chemical Formula 1.

$$X_2[A_{(n-1)}M_nO_{(3n+1)}]$$  Chemical Formula 1

In Chemical Formula 1, X is H, an alkali metal, a cationic polymer, or a combination thereof, A is Ca, Sr, La, Ta, or a combination thereof, and M is La, Ta, Ti, or a combination thereof, and n≥1.

According to an embodiment, Chemical Formula 1 is broadly divided into a positive-charged moiety of $X_2$ and a negative-charged moiety of the formula $[A_{(n-1)}M_nO_{(3n+1)}]$.

The two-dimensional layered material according to an embodiment may comprise a first layer consisting of $X_2$ and a second layer consisting of $[A_{(n-1)}M_nO_{(3n+1)}]$ and has an alternating structure of the first layer and the second layer once or more, and the two-dimensional layered material is electrically neutral, when viewed as a whole.

In addition, the second layer has a two-dimensional crystal structure formed by metal elements disposed in a position A and in a position M together with the oxygen atoms in Chemical Formula 1. Accordingly, the two-dimensional layered material according to an embodiment may have at least a two-dimensional crystal structure defined by the second layer.

In an embodiment, the second layer may have a different two-dimensional crystal structure depending upon a mole ratio of metal elements positioned in the A position and the M position in Chemical Formula 1.

FIG. 1 schematically shows a crystal structure of a two-dimensional layered material when n=2 in Chemical Formula 1 of a dielectric material according to an embodiment.

The two-dimensional layered material 210 according to an embodiment as shown in FIG. 1 may have a two-dimensional crystal structure including a first layer 211 of an assembly layer of alkali metal ions 2 and a second layer 212 of the formula $[A_{(n-1)}M_nO_{(3n+1)}]$, e.g., $[AM_2O_7]$ when n=2, as shown in FIG. 1.

In addition, the two-dimensional layered material 210 in FIG. 1 may have a structure in which the first layer 211 and the second layer 212 are alternately disposed, e.g., laminated, for three times or more, for example a crystal structure having a Ruddlesden-Popper phase or a layered perovskite crystal structure that is similar thereto.

However, a crystal structure of the two-dimensional layered material 210 according to an embodiment is not necessarily limited to the crystal structure shown in FIG. 1, but in a range of n≥1, may include all crystal structures in which the first layer 211 and the second layer 212 are alternately disposed once or more.

The second layer 212 may include at least two different metal elements in each of an A position and an M position in Chemical Formula 1. That is, each of the position A and the position M in Chemical Formula 1 may include at least two different metal elements.

For example, the two-dimensional layered material according to an embodiment may further satisfy Chemical Formula 2.

$$X_2[La_pA'_{(n-1-p)}M'_nO_{(3n+1)}]$$  Chemical Formula 2

In Chemical Formula 2, X is H, an alkali metal, a cationic polymer, or a combination thereof, A' is Ca, Sr, or a combination thereof, M' is Ta, Ti, or a combination thereof, n≥1, p>0, and n−1−p≥0.

In Chemical Formula 2, La and A' (which may comprise Ca, Sr, or a combination thereof) except for La are disposed in a position of A of Chemical Formula 1. Chemical Formula 2 may be obtained by substituting a portion of the La in the position A with Ca, Sr, or a combination thereof or a portion of the Ca, Sr, or combination thereof with La.

The two-dimensional layered material according to an embodiment may adjust electrical neutrality of Chemical Formula 2, as Ta, Ti, or a combination thereof except for La as $M'_n$ is disposed in the position M of Chemical Formula 2, when $La_pA'_{(n-1-p)}$ is disposed in the position A of Chemical Formula 1.

The two-dimensional layered material according to an embodiment may further satisfy Chemical Formula 3.

$$X_2[A''_{(n-1)}Ta_mTi_{(n-m)}O_{(3n+1)}]$$  Chemical Formula 3

In Chemical Formula 3, X is H, an alkali metal, a cationic polymer, or a combination thereof, A" is Ca, Sr, La, or a combination thereof, n≥1, m>0, and n−m>0.

In Chemical Formula 3, Ta and Ti are disposed in the position M of Chemical Formula 1. Chemical Formula 3 may also be accomplished by substituting a part of Ta in the position M with Ti and a part of Ti with Ta like Chemical Formula 2.

The two-dimensional layered material according to an embodiment may adjust electrical neutrality of Chemical Formula 3 due to a mole ratio of Ta, Ti and O, corresponding to a mole ratio of X (n=1 in Chemical Formula 3) when both Ta and Ti are disposed in the position M of Chemical Formula 1 as shown in Chemical Formula 3 or when Ca, Sr La, or a combination thereof except for La as $A''_{n-1}$ is disposed in the position A of Chemical Formula 1 (n>1 in Chemical Formula 3).

Figure 2:
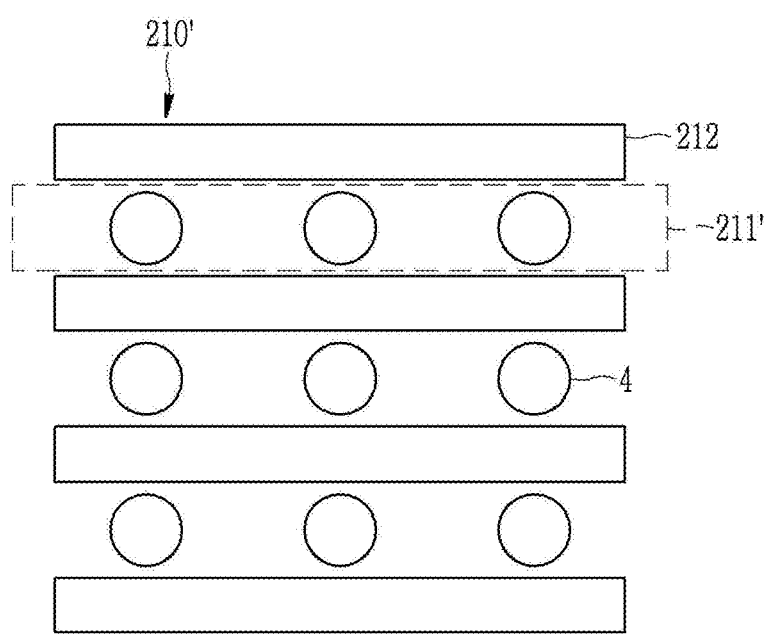
FIG. 2 schematically shows an embodiment of a structure of a first layer substituted with protons (H⁺) in a two-dimensional layered material.
Figure 3:
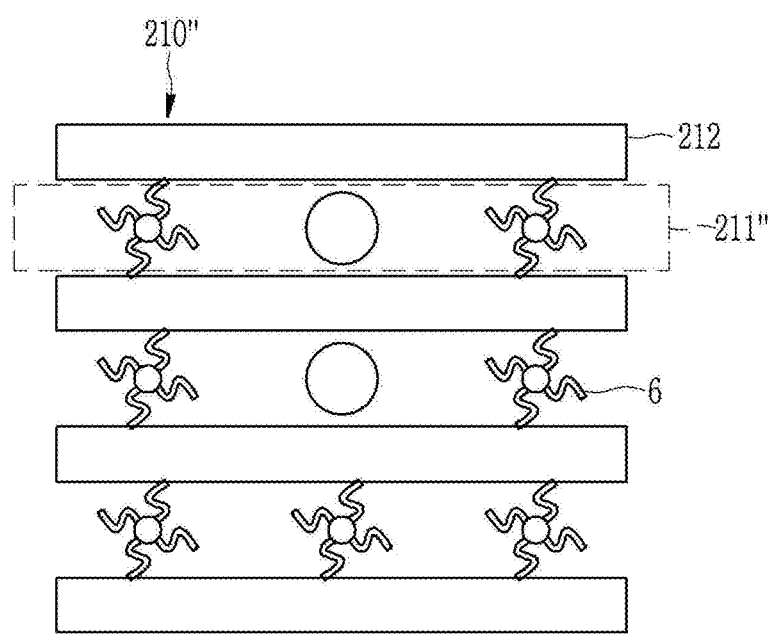
FIG. 3 schematically shows an embodiment of a structure wherein at least a portion of protons (H⁺) of a first layer are substituted with a cationic polymer in a two-dimensional layered material.

FIG. 2 schematically shows a structure of a first layer substituted with protons ($H^+$) in a two-dimensional layered material according to an embodiment and FIG. 3 schematically shows a structure wherein a portion of the protons ($H^+$) of a first layer our substituted with a cationic polymer in a two-dimensional layered material according to an embodiment.

Referring to FIGS. 1 to 3, the first layers 211, 211', and 211" in the two-dimensional layered materials 210, 210', and 210" according to an embodiment, which are one kind of a bond layer connecting between adjacent second layers 212, may include alkali metal ions 2 such as Li, Na, K, Rb, Cs, Fr, or a combination thereof as described above, or may be a layer that the alkali metal ion is substituted with a proton 4 or a cationic polymer 6.

For example, the two-dimensional layered material 210 may be an alternate laminate of a first layer 211 and a second layer 212 for three times or more as shown in FIG. 1, wherein the first layer 211 may include a layered metal oxide including an assembly layer of alkali metal ions 2.

However, when alkali metal ions 2 of the first layer 211 of the two-dimensional layered material 210 are replaced by protons 4, the first layer 211' becomes an assembly layer of protons 4 as shown in FIG. 2. In other words, the two-dimensional layered material 210' according to an embodiment may include a proton-type layered metal oxide, e.g., when the layered metal oxide is acid-treated.

In an embodiment, when at least a portion of protons 4 present in the first layer 211' of the two-dimensional layered material 210' are replaced by a cationic polymer 6, the first layer 211" becomes an assembly layer of protons 4 and cationic polymer 6 or an assembly layer of a cationic polymer, as shown in FIG. 3. Thus, the two-dimensional layered material 210" according to an embodiment may include a colloidized layered metal oxide formed by the cationic polymer 6.

According to an embodiment, the cationic polymer 6 is attached to the surface of the second layer 212 and also has a size of greater than or equal to the interlayer distance of the adjacent second layers 212. In other words, the cationic polymer may be an intercalant interposing between second layers 212 and widening a gap between second layers 212 to separate layers.

The cationic polymer 6 is not particularly limited as long it has a size in greater than or equal to the interlayer distance between adjacent second layers 212 and functioning as an intercalant, and may include, for example, a C1 to C16 alkyl ammonium compound, an alkylamine compound, or a combination thereof.

Non-limiting examples of the alkyl ammonium compound may be a tetramethylammonium (TMA) compound, a tetraethylammonium (TEA) compound, a tetrapropylammonium (TPA) compound, a tetrabutylammonium (TBA) compound, and the like, and non-limiting examples of the alkylamine compound may be a methylamine (MA) compound, an ethylamine (EA) compound, a propylamine (PA) compound, a butylamine (BA) compound, and the like, but are not limited thereto.

Figure 4:
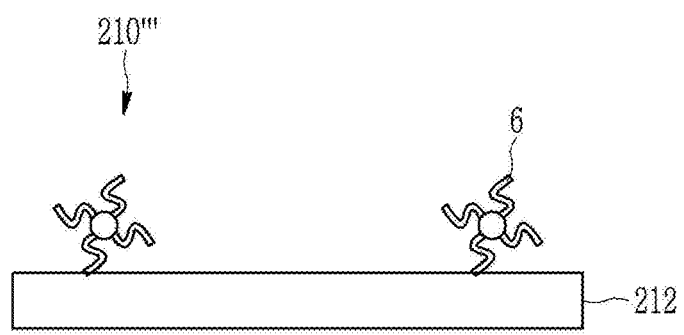
FIG. 4 schematically shows an embodiment of a monolayered nanosheet structure in which a cationic polymer is attached to a surface.
Figure 5:
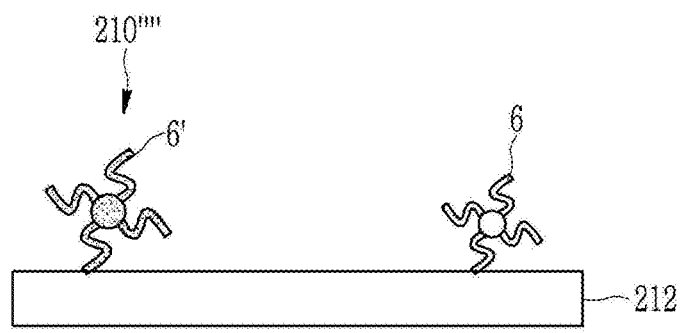
FIG. 5 schematically shows an embodiment of a monolayered nanosheet structure where at least two different cationic polymers are attached to a surface.

FIG. 4 schematically shows a monolayered nanosheet structure in which a cationic polymer is attached to a surface according to an embodiment, and FIG. 5 schematically a monolayered nanosheet structure where at least two different cationic polymers are attached to a surface according to an embodiment.

The two-dimensional layered materials 210'" and 210"" according to an embodiment may be a monolayered nanosheet shown in FIGS. 4 and 5.

The monolayered nanosheet comprises a cationic polymer 6 attached to the surface so that it is electrically neutral. This is because the second layer 212 has a negative charge, but the cationic polymer 6 has a positive charge.

The monolayered nanosheet has a structure in which the cationic polymer 6 is attached to the surface of the second layer 212 as shown in FIG. 4. The monolayered nanosheet may be obtained by substituting the assembly layer of an alkali metal ion 2, which is the first layer 211 in FIG. 1, with protons 4 as shown in FIG. 2; substituting the same with a cationic polymer 6 as shown in FIG. 3; and exfoliating the same.

As shown in FIG. 5, the monolayered nanosheet may have a structure in which greater than or equal to two kinds of cationic polymers 6 and 6' are adhered on the surface of the second layer 212. Referring to FIG. 5, when the cationic polymers 6 and 6' having a different molecule size are used as an intercalant, a higher yield rate of the monolayered nanosheet and its exfoliation efficiency may be improved compared with when one kind of cationic polymer is used alone.

In an embodiment, the two-dimensional layered material according to an embodiment may include a nanosheet laminate in which two or more monolayered nanosheets are disposed, e.g., laminated.

The nanosheet laminate according to an embodiment includes both an embodiment in which the monolayered nanosheet is incompletely separated as a monolayer so as to provide two or more layers, and an embodiment in which the preliminarily separated monolayered nanosheets are laminated in two or more layers.

When the monolayered nanosheets are laminated in two or more layers, the dielectric material according to an embodiment may further include a binder for binding between adjacent monolayered nanosheets.

Non-limiting examples of the binder according to an embodiment may be methyl cellulose, ethyl cellulose, hydroxypropyl methyl cellulose (HPMC), hydroxypropyl cellulose (HPC), xanthan gum, polyvinyl alcohol (PVA), polyvinyl pyrrolidone (PVP), carboxy methyl cellulose, hydroxyethyl cellulose, or a combination thereof. A content of the binder may be appropriately selected, but is not particularly limited. In an embodiment, the binder is contained in an amount of about 1 weight percent to about 20 weight percent, based on a total weight of the dielectric material.

The two-dimensional layered material according to an embodiment may have the average longest diameter of greater than or equal to about 0.1 μm, for example greater than or equal to about 0.5 μm, greater than or equal to about 1 μm, greater than or equal to about 2 μm, greater than or equal to about 3 μm, greater than or equal to about 4 μm, greater than or equal to about 5 μm, or greater than or equal to about 6 μm.

The two-dimensional layered material may have the average longest diameter of less than or equal to about 100 μm, for example, less than or equal to about 90 μm, less than or equal to about 80 μm, less than or equal to about 70 μm, less than or equal to about 60 μm, less than or equal to about 50 μm, less than or equal to about 40 μm, less than or equal to about 30 μm, less than or equal to about 20 μm, less than or equal to about 10 μm, less than or equal to about 9 μm, less than or equal to about 8 μm, less than or equal to about 7 μm, less than or equal to about 6 μm, or less than or equal to about 5 μm.

The two-dimensional layered material may have an average thickness of less than or equal to about 100 nm, less than or equal to about for example 90 nm, less than or equal to about 80 nm, less than or equal to about 70 nm, less than or equal to about 60 nm, less than or equal to about 50 nm, less than or equal to about 40 nm, less than or equal to about 30 nm, less than or equal to about 20 nm, less than or equal to about 10 nm, less than or equal to about for example, 5 nm, less than or equal to about 3 nm, less than or equal to about 2.5 nm, or less than or equal to about 2 nm. The two-dimensional layered material may have an average thickness of greater than or equal to about 1 nm.

The two-dimensional layered material according to an embodiment may provide a dielectric material having an ultra-thin film and improved dielectric characteristics compared to the another dielectric material, by adjusting the average longest diameter and the average thickness of the monolayered nanosheet according to an embodiment and within the disclosed ranges.

In an embodiment, the two-dimensional layered material according to an embodiment may have a relative permittivity of greater than or equal to about 100, for example greater than or equal to about 110, greater than or equal to about 120, greater than or equal to about 130, greater than or equal to about 140, greater than or equal to about 150, or greater than or equal to about 200. Even if the two-dimensional layered material is in a form of an ultra-thin film of a monolayered nanosheet having a thickness of several to several nanometers, it may show excellent relative permittivity at least as above.

$BaTiO_3$, $PbTiO_3$, or the like, is a dielectric material having a three-dimensional crystal structure. A core of $BaTiO_3$ is formed with a three-dimensional tetragonal crystal structure having a high dielectric constant, and the surface is formed with a three-dimensional cubic crystal structure having a low dielectric constant (low-k), so a fraction of the three-dimensional cubic crystal structure of the surface may be increased when a thickness of the dielectric material is decreased. Accordingly, other dielectric materials tend to decrease the dielectric constant according to decreasing the thickness of the dielectric material.

A dielectric material according to an embodiment has a two-dimensional crystal structure caused by the second layer 212 of the two-dimensional layered material. Such a two-dimensional crystal structure may be formed in very thin thickness of several to several hundred nanometers, for example, several nanometers to several tens of nanometers, and also may maintain the inherent crystal structure regardless of the thickness decrease, so it is very suitable for forming an ultra-thin film and providing improved dielectric characteristics compared to the other dielectric material.

Hereinafter, a dielectric device including the dielectric material is described.

Figure 6:
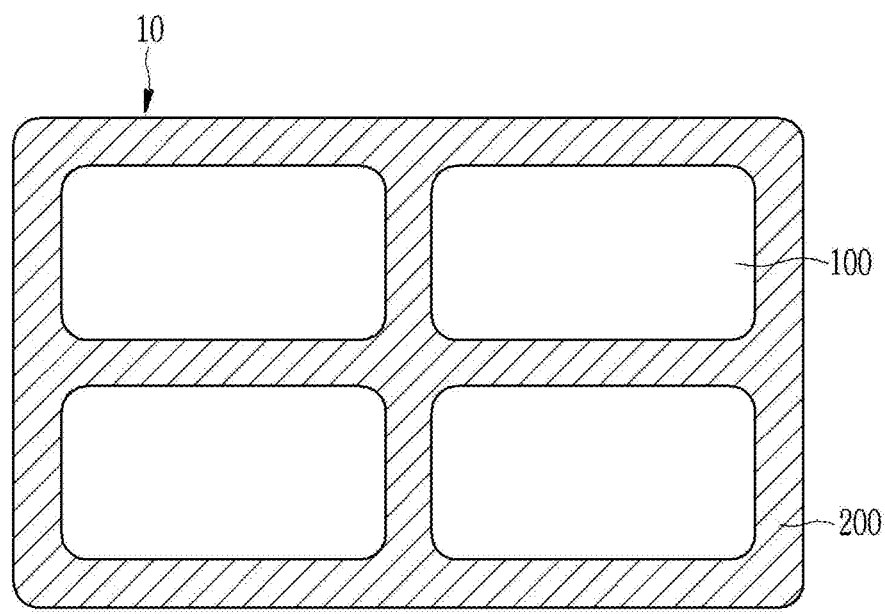
FIG. 6 schematically shows an embodiment of a dielectric device.

FIG. 6 schematically shows a dielectric device according to an embodiment.

A dielectric device 10 according to an embodiment may include a plurality of crystal grains 100 consisting of a material having semi-conductivity or conductivity and a grain boundary insulation layer 200 surrounding the crystal grain 100, wherein the grain boundary insulation layer 200 covers at least a part of the surface of the crystal grains and also includes the dielectric material including the two-dimensional layered material. A conductivity of a crystal grain 100 may be about $10^{-3}$ Siemens per meter (S/m) to about $10^8$ S/m, or about $10^{-2}$ to about $10^6$ S/m.

The dielectric device 10 according to an embodiment may be an intergranular insulation type capacitor which provides a capacitance in the grain boundary insulation layer 200 formed between the two crystal grains 100 when a predetermined voltage is applied to the adjacent two crystal grains 100, so as to function a capacitor.

In addition, the plurality of crystal grains and grain boundaries are connected with each other in serial and/or in parallel, so as to carry out the overall functions of the capacitor having a predetermined capacitance.

Referring to FIG. 6, a plurality of crystal grains 100 may be disposed in a plurality. A plurality of crystal grains 100 may be formed of a material having semi-conductivity or conductivity. A material of the crystal grains 100 may be, for example, a metal oxide including barium titanate, strontium titanate, lead titanate, lead zirconate, lead zirconate titanate, or a combination thereof.

According to an embodiment, a donor element may be further included in the material for the crystal grains 100. That is, the metal oxide for the crystal grains 100 has an oxygen vacancy, and the donor element may be solid-dissolved in the crystal grains 100. Accordingly, the crystal grains 100 may become semi-conductive. Examples of the donor element may include La, Sm, Dy, Ho, Y, Nd, Ce, Nb, Ta, W, and the like.

According to an embodiment, the average particle diameter of the crystal grains 100 may be variously determined considering an apparent relative permittivity of the dielectric device 10, but may be adjusted within the suitable range for down-sizing and thin-filming the dielectric device 10.

An average particle diameter of the crystal grains 100 may be for example less than or equal to about 1.5 μm, less than or equal to about 1.4 μm, less than or equal to about 1.3 μm, less than or equal to about 1.2 μm, less than or equal to about 1.1 μm, less than or equal to about 1.0 μm, less than or equal to about 900 nm, less than or equal to about 800 nm, less than or equal to about 700 nm, less than or equal to about 600 nm, or less than or equal to about 500 nm and may be for example greater than or equal to about 50 nm, greater than or equal to about 60 nm, greater than or equal to about 70 nm, greater than or equal to about 80 nm, greater than or equal to about 90 nm, or greater than or equal to about 100 nm.

The grain boundary insulation layer 200 includes the dielectric material. A ratio of the two-dimensional layered material in the grain boundary insulation layer 200 is not particularly limited but may be variously determined considering a relative permittivity of other materials, for example, a three-dimensional bulk material having a three-dimensional crystal structure, a raw material, a thickness when forming the grain boundary insulation layer 200, and the like. But it may be determined enough to provide excellent relative permittivity caused by the two-dimensional layered material even when the grain boundary insulation layer 200 is formed in a size of several nanometers to several tens of nanometers.

A ratio of the two-dimensional layered material in the grain boundary insulation layer 200 may be for example greater than or equal to about 10 volume %, greater than or equal to about 15 volume %, greater than or equal to about 20 volume %, greater than or equal to about 25 volume %, greater than or equal to about 30 volume %, greater than or equal to about 35 volume %, for example, greater than or equal to about 40 volume %, greater than or equal to about 45 volume %, greater than or equal to about 50 volume %, greater than or equal to about 55 volume %, greater than or equal to about 60 volume %, greater than or equal to about 65 volume %, greater than or equal to about 70 volume %, greater than or equal to about 75 volume %, greater than or equal to about 80 volume %, greater than or equal to about 85 volume %, greater than or equal to about 90 volume %, greater than or equal to about 95 volume %, or greater than or equal to about 100 volume % based on 100 volume % of the grain boundary insulation layer 200.

In an embodiment, the two-dimensional layered material may be directly contacted with the surface of the crystal grains 100, or may be disposed so that at least a part thereof may leave a space in a predetermined gap from the surface of the crystal grains 100.

In addition, the two-dimensional layered material is formed only in a partial region of the surface of the crystal grains 100 to cover a part of the surface of crystal grains 100, or is formed to cover the entire surface of the crystal grains 100.

The dielectric device 10 may have a relative permittivity caused by the two-dimensional crystal structure of the two-dimensional layered material the grain boundary insulation layer 200. The relative permittivity of the dielectric device 10 according to an embodiment may be variously determined depending upon an average particle diameter of the crystal grain and a thickness of the grain boundary insulation layer, but the dielectric device 10 may have a relative permittivity allowable for a capacitor even if it is formed in a ultra-small size, a ultra-thin film.

The dielectric device 10 may have a relative permittivity of, for example, greater than or equal to about 1000, greater than or equal to about 2000, greater than or equal to about 3000, greater than or equal to about 4000, greater than or equal to about 5000, greater than or equal to about 6000, greater than or equal to about 7000, greater than or equal to about 8000, greater than or equal to about 9000, or greater than or equal to about 10000.

In an embodiment, the dielectric device may satisfy the following Equation 1 relating to the apparent relative permittivity.

$$\varepsilon_{rAPP} \square \varepsilon_r \cdot d/t \qquad \text{Equation 1}$$

In Equation 1, $\varepsilon_{rAPP}$ refers to an apparent relative permittivity of a dielectric device, $\varepsilon_r$ refers to a relative permittivity of a grain boundary insulation layer, d refers to an average particle diameter of a crystal grain, and t refers to a thickness of a grain boundary insulation layer.

The intergranular insulation layer, which is a dielectric device, includes only three-dimensional bulk material having a three-dimensional crystal structure such as $BaTiO_3$, $PbTiO_3$, and the like, and the apparent relative permittivity of the dielectric device also tends to be decreased when a thickness t of the grain boundary insulation layer is decreased. Accordingly, the intergranular insulation layer dielectric device is difficult to form a grain boundary insulation layer in an ultra-thin film having a thickness below the predetermined level.

The dielectric device according to an embodiment has a two-dimensional crystal structure by including at least two-dimensional layered material, the dielectric device may provide a relative permittivity which is greater than or equal to a predetermined level, caused by the two-dimensional layered material, even if the grain boundary insulation layer is formed in a ultra-thin film having a thickness t of several nanometers to several tens of nanometers. That is, when using the two-dimensional layered material, it may independently control a thickness and a relative permittivity of the grain boundary insulation layer unlike the intergranular insulation layer dielectric device.

Thus the dielectric device according to an embodiment includes the two-dimensional layered material in the grain boundary insulation layer, so that it may provide a relative permittivity in greater than or equal to a predetermined level caused by the two-dimensional layered material even if the dielectric device is formed in ultra-thin film having several nanometers to several tens of nanometers, and also the device may be formed in a small-size and thin-film.

According to another embodiment, an electronic device includes the dielectric device 10. The electronic device may be a device functioning as a variable resistor, such as a varistor, or a thermistor, or as an energy storage capacitor.

Hereinafter, a method of manufacturing the dielectric material is described.

Figure 7:
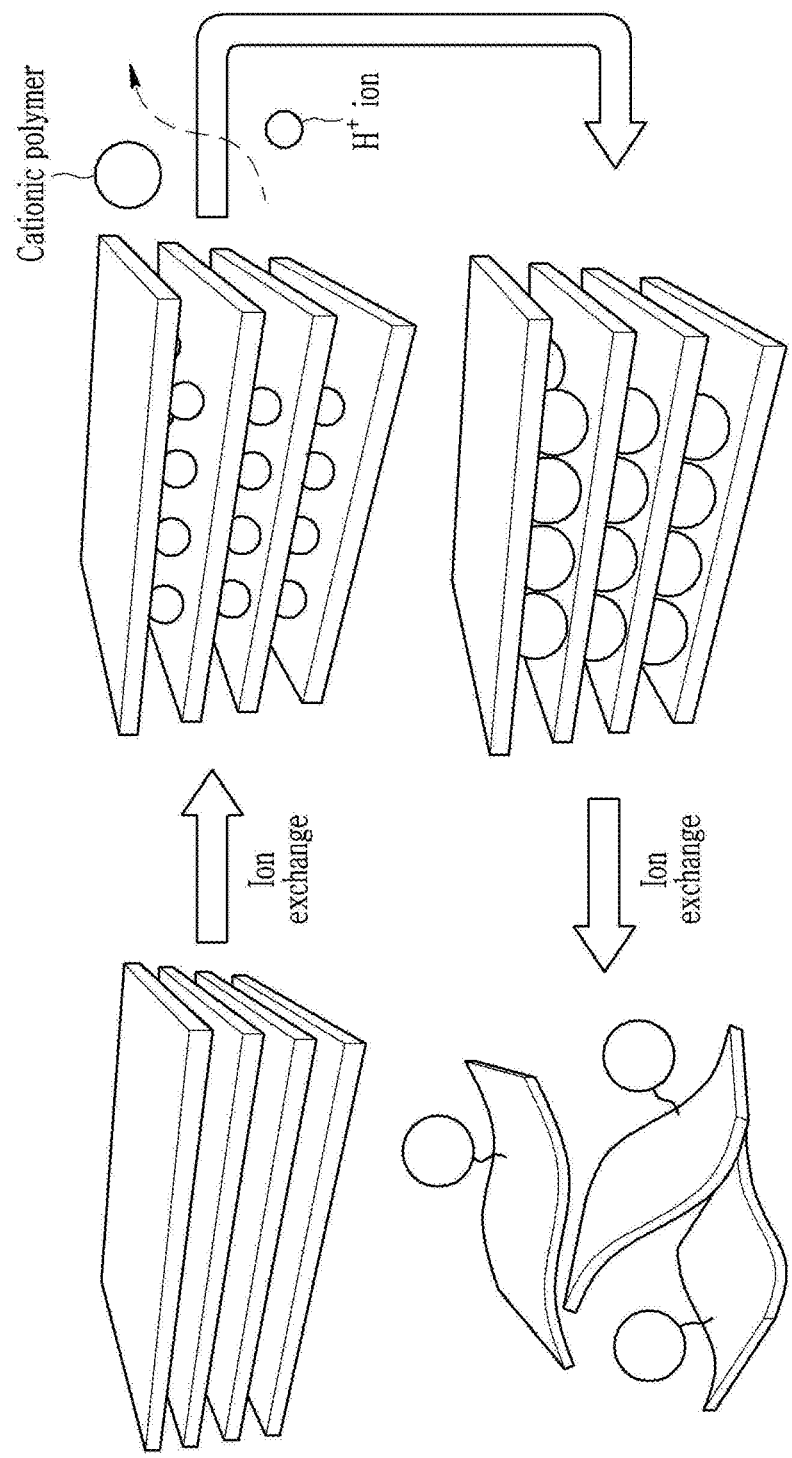
FIG. 7 shows an embodiment of a process of exfoliating a monolayered nanosheet from a layered metal oxide in a method of manufacturing a dielectric material.

FIG. 7 sequentially shows a process of exfoliating a monolayered nanosheet from a layered metal oxide in a method of manufacturing a dielectric material according to an embodiment According to an embodiment, a method of manufacturing a dielectric material according to an embodiment includes preparing a layered metal oxide including a first layer having a positive charge and a second layer having a negative charge which are alternately laminated, acid-treating the layered metal oxide to exchange the first layer with protons, colloidizing the acid-treated layered metal oxide to replace the protons by cationic polymers, and exfoliating the monolayered nanosheet including the second layer from the colloidized layered metal oxide.

Hereinafter, the process of exfoliating the layered metal oxide of $K_2[SrLaTi_2TaO_{10}]$ into $(TBA,EA)-[SrLaTi_2TaO_{10}]$ monolayered nanosheets further referring to FIGS. 8 to 10. However, FIGS. 8 to 10 show an example of the method of manufacturing a dielectric material according to an embodiment, and the disclosed method is not limited to the layered metal oxide or the used cationic polymer.

Figure 8:
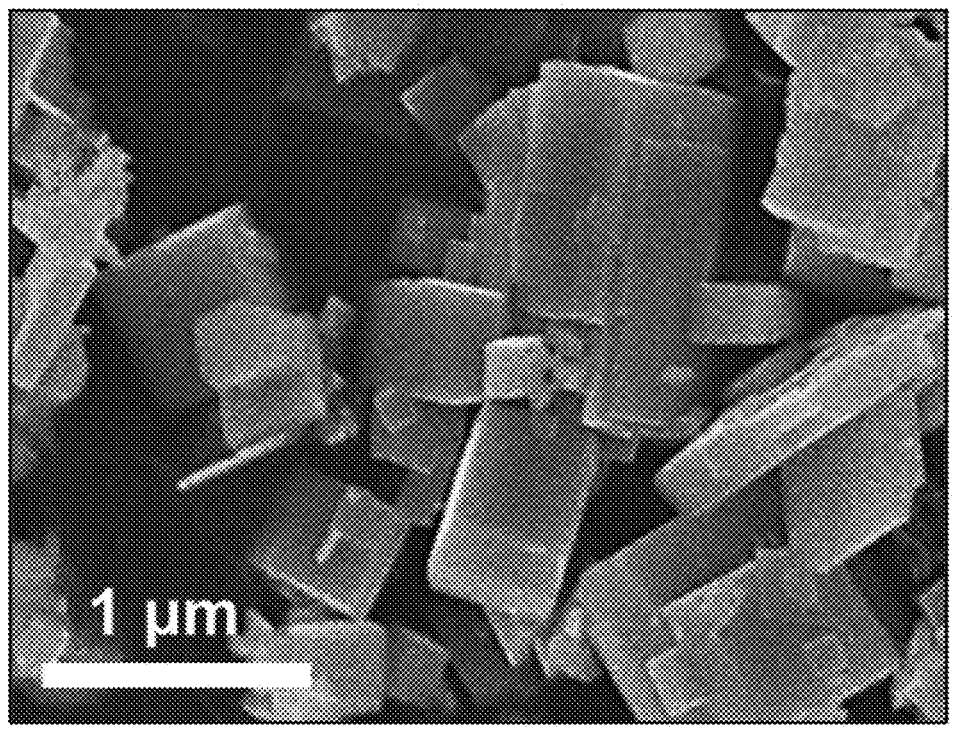
FIG. 8 is a microscopic image showing a layered metal oxide of the formula K₂[SrLaTi₂TaO₁₀]

FIG. 8 is a microscopic image of a layered metal oxide $K_2[SrLaTi_2TaO_{10}]$ according to an embodiment.

First, as shown in FIG. 8, a layered metal oxide where a first layer ($K_2$) and a second layer ($SrLaTi_2TaO_{10}$) are alternately laminated for several times is prepared.

Figure 9:
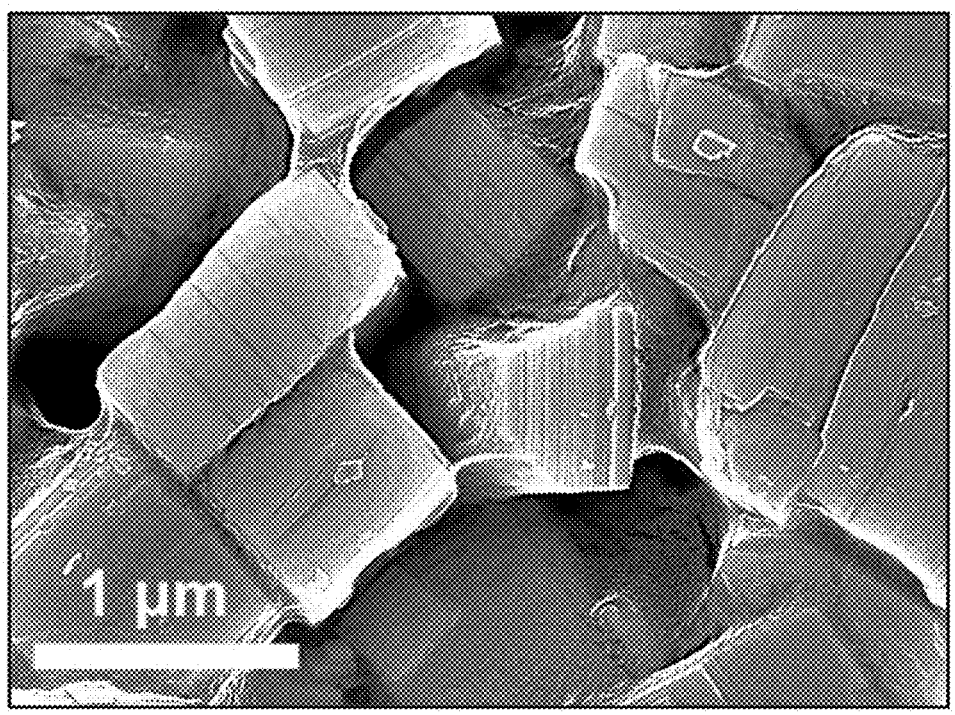
FIG. 9 is a microscopic image showing H₂[SrLaTi₂TaO₁₀] where the layered metal oxide of FIG. 8 is substituted with protons (H⁺)
Figure 10:
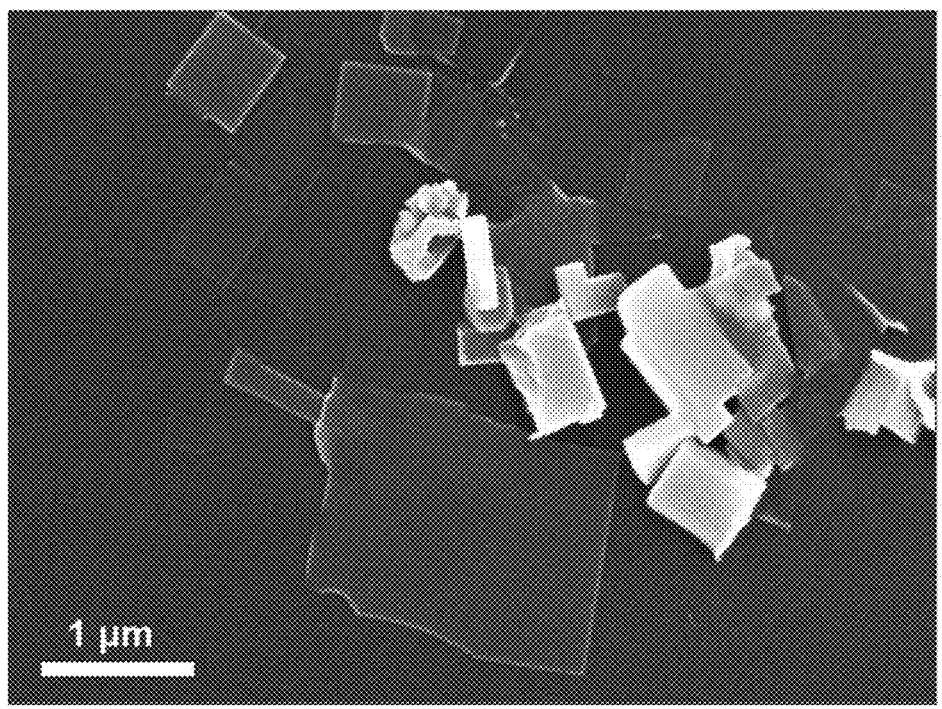
FIG. 10 is a microscopic image showing a mixture of an exfoliated colloidized layered metal oxide and an exfoliated monolayered nanosheet.

FIG. 9 is a microscopic image showing $H_2[SrLaTi_2TaO_{10}]$ where the layered metal oxide of FIG. 8 is substituted with protons ($H^+$).

Subsequently, the layered metal oxide is reacted with an acidic solution such as HCl, $HNO_3$ and the like to make the cationic first layer to be protonized. In an embodiment, a potassium ion of the first layer is ion-exchanged with proton to make the first layer into an assembly layer consisting of protons. Accordingly, the layered metal oxide becomes proton-type layered metal oxide represented by $H_2[SrLaTi_2TaO_{10}]$.

Then, the obtained proton-type layered metal oxide is reacted with a cationic polymer to provide a colloid. Examples of the cationic polymer may be a tetramethylammonium compound, a tetraethylammonium compound, a tetrapropylammonium compound, a tetrabutylammonium compound, a methylamine compound, an ethylamine compound, a propylamine compound, a butylamine compound, or combination thereof. Thereby, at least a part of protons of the first layer may be substituted with a cationic polymer.

As the cationic polymer has a large molecule size, it may be interposed between adjacent second layers to widen a gap between the second layers, inducing to separate layers.

According to an embodiment, the acid-treated layered metal oxide may be colloidized by two or more kinds of the cationic polymers. That is, two or more kinds of cationic polymers having different sizes from each other may be used during substituting the cationic polymer.

For example, the two or more kinds of cationic polymers having different sizes from each other may be two or more kinds of compound having different sizes by having different carbon numbers of alkyl groups or different functional groups from each other.

When two or more kinds of cationic polymers are used as above, the two or more kinds of cationic polymers may be present on the surface of the prepared monolayered nanosheet.

Without being bound by any particular theory, it may be difficult to uniformly exfoliate it into a monolayer when using only one kind of intercalant having a predetermined size during the intercalation exfoliation process. For example, when a single intercalant such as tetrabutylammonium hydroxide (TBAOH) or tetramethylammonium hydroxide (TMAOH), ethylamine (EA) is used, the protonized layered metal oxide is difficult to be exfoliated into monolayers but may be exfoliated into a sheet having two or more layers with a random thickness, and the obtained nanosheets may have an average thickness of about 3 nm to about 4 nm.

For example, when using a single intercalant having a large molecule size such as TBAOH, it is difficult to provide exfoliated nanosheets having a uniform and thin thickness. On the other hand, when using intercalant having a small molecule size such as TMAOH, EA, it is difficult to provide exfoliated nanosheets.

Accordingly, by using intercalant having a large molecule size such as TBAOH together with intercalant having a small molecule size such as TMAOH, EA, a yield of monolayered nanosheets and the exfoliation efficiency may be improved.

However, an embodiment is not necessarily limited thereto, but it may be exfoliated by using only the single cationic polymer as the intercalant.

Then, the layered metal oxide colloidized by cationic polymers is added into a solvent and stirred to exfoliate a monolayered nanosheet from the colloidized layered metal oxide.

The stirring may include an ultrasonication. For example, the cationic polymer is inserted by stirring for a predetermined time and performed with an ultrasonication. The ultrasonic power may be greater than or equal to about 20 Watts (W), for example, greater than or equal to about 40 W, or greater than or equal to about 60 W. The ultrasonic power may be less than or equal to about 400 W, for example, less than or equal to about 300 W, less than or equal to about 200 W, or less than or equal to about 100 W. The means for ultrasonication may include any disclosed devices or commercially available devices.

The stirring time is not particularly limited and may be appropriately selected. For example, the stirring time may be greater than or equal to about 10 minutes, greater than or equal to about 30 minutes, or greater than or equal to 1 hour. The stirring time may be greater than or equal to about 1 day, greater than or equal to about 2 days, or even greater than or equal to about 3 days. The ultrasonication stirring may shorten the stirring time. The ultrasonication time may be greater than or equal to about 1 minute, for example, greater than or equal to about 5 minutes. The ultrasonication time may be less than or equal to about 300 minutes, for example, less than or equal to about 100 minutes, less than or equal to about 90 minutes, less than or equal to about 80 minutes, less than or equal to about 70 minutes, or less than or equal to about 60 minutes.

The monolayered nanosheets obtained by the ultrasonication may show a relatively low deviation in a lateral size. Thus, according an embodiment, the monolayered nanosheets may shows a standard deviation of less than or equal to about 1.5 µm, for example, less than or equal to about 1 µm, less than or equal to about 0.9 µm, less than or equal to about 0.8 µm, less than or equal to about 0.7 µm, less than or equal to about 0.6 µm, or less than or equal to about 0.5 µm in a lateral size.

When the monolayered nanosheets are exfoliated by ultrasonication, it is easily control a concentration of the obtained colloid solution compared to the simple stirring. According to an embodiment, the concentration of the monolayered nanosheets in the colloid solution may be about 1 g/L to about 1.7 g/L, for example, about 1.3 g/L to about 1.6 g/L.

FIG. 10 is a microscopic image showing an exfoliated colloidized layered metal oxide and an exfoliated monolayered nanosheet which are mixed.

In an embodiment, the colloidized layered metal oxide and the monolayered nanosheets may be mixed even if exfoliation is completed as shown in FIG. 10. The monolayered nanosheets include a second layer and a cationic polymer, wherein the cationic polymer is attached to the surface of the second layer. That is, the monolayered nanosheet may be represented by "cationic polymer-[$A_{(n-1-\delta)}M_nO_{3n+1}$]". For example, tetrabutylammonium hydroxide (TBAOH) and ethylamine (EA) are used as an intercalant in FIG. 10, and so the monolayered nanosheet is represented by (TBA,EA)-[$SrLaTi_2TaO_{10}$].

Then the exfoliated monolayered nanosheet is post-processed to provide powder or processed to provide in a shape of pellet and the like, or processed in a shape of a coating agent or the like that C1 to C15 alcohol, a binder, and selectively a dispersing agent (e.g., C2 to C20 organic acid) are mixed in a colloidal aqueous solution including the obtained monolayered nanosheet.

According to the method of manufacturing the dielectric material of an embodiment, the layered metal oxide may be exfoliated in a single nanosheet by the simple process, so a dielectric material including the exfoliated single nanosheet may show a high relative permittivity even in the region having a thickness ranging from several nanometers to several tens of nanometers.

Hereinafter, the embodiments are illustrated in more detail with reference to examples. These examples, however, are not in any sense to be interpreted as limiting the scope of the present disclosure.

EXAMPLES

Measurement Method:
(Relative Permittivity)

Relative permittivity of obtained powders is measured through a dielectric analysis.

After putting a measurement subject powder between two electrodes (a dielectric sensor), a voltage of 1 volt (V) having a wavelength of about 1 kilohertz (kHz) is applied to one electrode. Herein, the wavelength transferred therefrom is measured at the other electrode.

A transferred signal has a reduced amplitude due to movement of ions and alignment of polarity, and thus its phase position is moved. When a material has polarity, an electric field is realigned, ions having a charge move toward an electrode having opposite polarity. Characteristics of a dielectric material such as a dielectric constant and a loss coefficient are calculated by using the measured amplitude and the phase change.

Subsequently, the dielectric constant data of each powder are divided by a vacuum dielectric constant $\varepsilon_0$ to calculate relative permittivity of each powder.

Preparation Example: Preparation of (TBA,EA)-$[A_{n-1}M_nO_{3n+1}]$ Nanosheet $K_2CO_3$, a metal oxide, and a M metal oxide are mixed in a mole ratio of 2.8:n−1:n, and the mixture is molded into a pellet. 10 grams (g) of the obtained pellet is put in an alumina crucible and heat-treated at 600° C. to 1400° C. for 12 hours under an air atmosphere in a tube furnace. Subsequently, the furnace is cooled down to room temperature, and the treated pellet is taken therefrom and ground to obtain fine powder.

The obtained fine powder is washed with 500 milliliters (mL) to 2 liters (L) of water for 6 hours and filtered to obtain powder. The obtained powder has a composition of $K_2[A_{n-1}M_nO_{3n+1}]$ and a layered structure shown in FIG. 8.

The obtained $K_2[A_{n-1}M_nO_{3n+1}]$ powder is put in a 5 M $HNO_3$ solution, and the mixture is stirred for 3 days and filtered to obtain only powder. The obtained powder has a composition of $H_2[A_{n-1}M_nO_{3n+1}]$ and a layered structure shown in FIG. 9.

Subsequently, a 0.1 molar (M) EA aqueous solution as an intercalant is added to 1 g of the obtained $H_2[A_{n-1}M_nO_{3n+1}]$ powder, and the obtained mixture is stirred for 7 days. Then, a 0.25 M TBAOH aqueous solution is added again thereto, and the obtained mixture is additionally stirred over 6 days.

After all the processes, a final solution is centrifuged at 6000 rpm for 30 minutes, and the floating intercalant is removed by using a dialysis tube to obtain an aqueous colloid solution including exfoliated (TBA,EA)-$[A_{n-1}M_nO_{3n+1}]$ nanosheets. In the aqueous colloid solution, the (TBA,EA)-$[A_{n-1}M_nO_{3n+1}]$ nanosheets and colloidized layered metal oxide are mixed as shown in FIG. 10.

Among them, the monolayered nanosheets exfoliated from $K_2[A_{n-1}M_nO_{3n+1}]$ show that $TMA^+$ and $EA^+$ are adhered together on the surface of an $A_{n-1}M_nO_{3n+1}$ layer having a two-dimensional crystal structure as shown in FIG. 5.

Example 1: $H_2[CaLaTi_2TaO_{10}]$ Proton-Type Layered Metal Oxide $K_2[CaLaTi_2TaO_{10}]$ powder instead of the $K_2[A_{n-1}M_nO_{3n+1}]$ powder is obtained according to the same method as Preparation Example except for mixing $K_2CO_3$, $CaCO_3$, $La_2O_3$, $TiO_2$, and $Ta_2O_5$ in a mole ratio of 1.4:1:0.5:2:0.5.

Subsequently, the obtained $K_2[CaLaTi_2TaO_{10}]$ powder is put in a 5 M $HNO_3$ solution, and the mixture is stirred for 3 days and filtered to obtain $H_2[CaLaTi_2TaO_{10}]$ powder.

The obtained $H_2[CaLaTi_2TaO_{10}]$ powder is molded into a pellet and heat-treated to obtain a pellet comprising a $H_2[CaLaTi_2TaO_{10}]$ proton-type metal oxide according to Example 1.

Example 2: $H_2[Ca_2Ta_2TiO_{10}]$ Proton-Type Layered Metal Oxide $H_2[Ca_2Ta_2TiO_{10}]$ powder is obtained according to the same method as Example 1 except for mixing $K_2CO_3$, $CaCO_3$, $Ta_2O_5$, and $TiO_2$ in a mole ratio of 1.4:2:1:1.

The obtained $H_2[Ca_2Ta_2TiO_{10}]$ powder is molded into a pellet and heat-treated to obtain a pellet comprising a $H_2[Ca_2Ta_2TiO_{10}]$ proton-type metal oxide according to Example 2.

Example 3: $H_2[SrLaTi_2TaO_{10}]$ Proton-Type Layered Metal Oxide $H_2[SrLaTi_2TaO_{10}]$ powder is obtained according to the same method as Example 1 except for mixing $K_2CO_3$, $SrCO_3$, $La_2O_3$, $TiO_2$, and $Ta_2O_5$ in a mole ratio of 1.4:2:1:1.

The obtained $H_2[SrLaTi_2TaO_{10}]$ powder is molded into a pellet and heat-treated to obtain a pellet comprising a $H_2[SrLaTi_2TaO_{10}]$ proton-type metal oxide according to Example 3.

Example 4: $H_2[Sr_2Ta_2TiO_{10}]$ Proton-Type Layered Metal Oxide $H_2[Sr_2Ta_2TiO_{10}]$ powder is obtained according to the same method as Example 1 except for mixing $K_2CO_3$, $SrCO_3$, $Ta_2O_5$, and $TiO_2$ in a mole ratio of 1.4:2:1:1.

The obtained $H_2[Sr_2Ta_2TiO_{10}]$ powder is molded into a pellet and heat-treated to obtain a pellet comprising a $H_2[Sr_2Ta_2TiO_{10}]$ proton-type metal oxide according to Example 4.

Comparative Example 1: $BaTiO_3$ Three-Dimensional Bulk Material $BaCO_3$ and $TiO_2$ are mixed in a mole ratio of 1:1, and the mixture is ball-milled to prepare slurry. The slurry is dried through evaporation and calcinated to obtain $BaTiO_3$ powder.

Referring to a FE-SEM analysis result of the $BaTiO_3$ powder, the $BaTiO_3$ pellet is a three dimensional bulk material having a three dimensional crystal structure, and the three dimensional crystal structure has an average thickness of less than 50 nm.

Subsequently, the obtained $BaTiO_3$ powder is molded into a pellet and heat-treated to obtain a pellet comprising $BaTiO_3$ according to Comparative Example 1.

Comparative Example 2: $H[Ca_2Nb_3O_{10}]$ Proton-Type Layered Metal Oxide $K[Ca_2Nb_3O_{10}]$ powder is obtained according to the same method as Preparation Example except for mixing $K_2CO_3$, $CaCO_3$, and $Nb_2O_5$ in a mole ratio of 0.5:2:1.5.

Subsequently, the obtained K[Ca$_2$Nb$_3$O$_{10}$] powder is added to a 5 M HNO$_3$ solution, and the mixture is stirred for 3 days and filtered to obtain H[Ca$_2$Nb$_3$O$_{10}$] powder.

Referring to a FE-SEM analysis result, the H[Ca$_2$Nb$_3$O$_{10}$] powder has a two-dimensional crystal structure due to [Ca$_2$Nb$_3$O$_{10}$].

Subsequently, the obtained H[Ca$_2$Nb$_3$O$_{10}$] powder is molded into a pellet and heat-treated to obtain a pellet comprising a H[Ca$_2$Nb$_3$O$_{10}$] proton-type metal oxide according to Comparative Example 2.

Relative permittivity of the powders according to Examples and Comparative Examples is measured according to the aforementioned measurement method, and the results are shown in Table 1.

TABLE 1

| | Compositions | Dielectric constant (1 kHz) | Two-dimensional crystal structure |
|---|---|---|---|
| Example 1 | H$_2$[CaLaTi$_2$TaO$_{10}$] | 146 | ◯ |
| Example 2 | H$_2$[Ca$_2$Ta$_2$TiO$_{10}$] | 131 | ◯ |
| Example 3 | H$_2$[SrLaTi$_2$TaO$_{10}$] | 204 | ◯ |
| Example 4 | H$_2$[Sr$_2$Ta$_2$TiO$_{10}$] | 157 | ◯ |
| Comparative Example 1 | BaTiO$_3$ | 50 | X |
| Comparative Example 2 | H[Ca$_2$Nb$_3$O$_{10}$] | 72 | ◯ |

Referring to Table 1, Examples 1 to 4 all have a two-dimensional crystal structure due to [A$_{(n-1)}$M$_n$O$_{(3n+1)}$] having a negative charge and represented by Chemical Formula 1. In addition, the proton-type layered metal oxides according to Examples 1 to 4 have high relative permittivity of greater than or equal to 130.

Comparative Example 1 has a 3 dimensional crystal structure due to a core having a BaTiO$_3$ square crystal structure and a surface having an equi-axied crystal structure and when adjusted to have an average thickness of less than 50 nm, a very low dielectric constant compared with Examples 1 to 4.

Comparative Example 2 has a two-dimensional crystal structure due to [A$_{(n-1)}$M$_n$O$_{(3n+1)}$], which is similar to Examples 1 to 4. However, the proton-type layered metal oxide according to Comparative Example 2 has very low relative permittivity of 72 compared with Examples. The reason is that Comparative Example 2 does not satisfy X$_2$[A$_{(n-1)}$M$_n$O$_{(3n+1)}$] of Chemical Formula 1 and thus has a different crystal phase from those of Examples 1 to 4.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A dielectric material, comprising at least one of:
   a layered metal oxide comprising
     a first layer having a positive charge, and
     a second layer having a negative charge, wherein the first layer and the second layer are alternately disposed;
   a monolayered nanosheet exfoliated from the layered metal oxide;
   a nanosheet laminate of the monolayered nanosheets;
   wherein the dielectric material comprises a two-dimensional layered material having a two-dimensional crystal structure,
   wherein the two-dimensional layered material is represented by Chemical Formula 1

   $$X_2[A_{(n-1)}M_nO_{(3n+1)}]$$  Chemical Formula 1 wherein, in Chemical Formula 1,
   X is a combination of a cationic polymer and at least one of H or an alkali metal,
   A is Ca, Sr, La, Ta, or a combination thereof,
   M is La, Ta, Ti, or a combination thereof, and
   n≥1.

2. The dielectric material of claim 1, wherein the cationic polymer comprises a C1 to C16 alkyl ammonium compound, an alkylamine compound, or a combination thereof.

3. The dielectric material of claim 2, wherein the cationic polymer comprises a tetramethylammonium compound, a tetraethylammonium compound, a tetrapropylammonium compound, a tetrabutylammonium compound, a methylamine compound, an ethylamine compound, a propylamine compound, a butylamine compound, or a combination thereof.

4. The dielectric material of claim 1, wherein the first layer of the layered metal oxide comprises a proton, an alkali metal ion, or a combination thereof.

5. The dielectric material of claim 1, wherein the monolayered nanosheet comprises the second layer, and wherein the second layer is exfoliated from the layered metal oxide.

6. The dielectric material of claim 5, wherein the monolayered nanosheet comprises the cationic polymer attached to the surface of the second layer.

7. The dielectric material of claim 6, wherein the monolayered nanosheet comprises a first cationic polymer and a second cationic polymer, wherein the first and second cationic polymers are attached to a surface of the second layer and are different.

8. The dielectric material of claim 1, wherein the two-dimensional layered material has relative permittivity of greater than or equal to about 100.

9. The dielectric material of claim 1, wherein the two-dimensional layered material further satisfies Chemical Formula 2:

   $$X_2[La_pA'_{(n-1-p)}M'_nO_{(3n+1)}]$$  Chemical Formula 2 wherein, in Chemical Formula 2,
   X is H, an alkali metal, a cationic polymer, or a combination thereof,
   A' is Ca, Sr, or a combination thereof,
   M' is Ta, Ti, or a combination thereof,
   n≥1, p>0, and n−1−p≥0.

10. The dielectric material of claim 1, wherein the two-dimensional layered material further satisfies Chemical Formula 3:

    $$X_2[A''_{(n-1)}Ta_mTi_{(n-m)}O_{(3n+1)}]$$  Chemical Formula 3 wherein, in Chemical Formula 3,
    X is H, an alkali metal, a cationic polymer, or a combination thereof,
    A'' is Ca, Sr, La, or a combination thereof,
    n≥1, m>0, and n−m>0.

11. The dielectric device of claim 10, wherein the crystal grain consists of barium titanate, strontium titanate, lead titanate, lead zirconate, lead zirconate titanate, or a combination thereof.

12. A dielectric device comprising:
    a plurality of crystal grains, each consisting of a semiconductive or conductive material, and
    a grain boundary insulation layer surrounding each crystal grain of the plurality of crystal grains, the grain boundary insulation layer comprising a two-dimensional layered material represented by Chemical Formula 1 and having a two-dimensional crystal structure, $$X_2[A_{(n-1)}M_nO_{(3n+1)}] \quad \text{Chemical Formula 1}$$

wherein, in Chemical Formula 1,

X is a combination of a cationic polymer and at least one of H or an alkali metal, A is Ca, Sr, La, Ta, or a combination thereof, M is La, Ta, Ti, or a combination thereof, and $n \geq 1$.

13. The dielectric device of claim 12, wherein the two-dimensional layered material comprises
  a layered metal oxide comprising a first layer having a positive charge and a second layer having a negative charge, wherein the first and second layers are alternately disposed,
  a monolayered nanosheet,
  a nanosheet laminate of the monolayered nanosheets, or
  a combination thereof.

14. The dielectric device of claim 12, wherein the two-dimensional layered material covers an entire surface of the crystal grain.

15. The dielectric device of claim 12, wherein the cationic polymer includes a C1 to C16 alkyl ammonium, an alkylamine, or a combination thereof.

16. The dielectric device of claim 12, wherein the two-dimensional layered material is included in an amount of about 10 volume % to about 100 volume %, based on 100 volume % of the grain boundary insulation layer.

17. An electronic device includes the dielectric device of claim 12.

18. The electronic device of claim 17, wherein the electronic device is a varistor, a thermistor, or an energy storage capacitor.

* * * * *